(12) United States Patent
Shepard

(10) Patent No.: US 9,322,693 B2
(45) Date of Patent: Apr. 26, 2016

(54) MEASURING AND DISPENSING CONTAINER TOP

(71) Applicant: Daniel Robert Shepard, North Hampton, NH (US)

(72) Inventor: Daniel Robert Shepard, North Hampton, NH (US)

( * ) Notice: Subject to any disclaimer, the term of this patent is extended or adjusted under 35 U.S.C. 154(b) by 61 days.

(21) Appl. No.: 14/291,082

(22) Filed: May 30, 2014

(65) Prior Publication Data

US 2015/0346011 A1 Dec. 3, 2015

Related U.S. Application Data

(60) Provisional application No. 61/829,817, filed on May 31, 2013.

(51) Int. Cl.
*G01F 11/22* (2006.01)

(52) U.S. Cl.
CPC ...................................... *G01F 11/22* (2013.01)

(58) Field of Classification Search
CPC ....................................................... G01F 11/22
USPC ............. 222/1, 284, 427, 430, 434, 450, 451, 222/452
See application file for complete search history.

(56) References Cited

U.S. PATENT DOCUMENTS

| | | | | | |
|---|---|---|---|---|---|
| 2,515,735 | A | * | 7/1950 | Saunders | A47G 19/34 222/427 |
| 2,898,010 | A | * | 8/1959 | Tepper | B65D 83/06 222/339 |
| 3,007,612 | A | * | 11/1961 | Tepper | A47G 19/34 222/284 |
| 3,018,924 | A | * | 1/1962 | Reed | A47G 19/24 222/367 |
| 3,130,874 | A | * | 4/1964 | Bulmer | A47G 19/34 222/142.8 |
| 3,866,805 | A | * | 2/1975 | Hamilton, Jr. | G01F 11/46 222/427 |
| 4,071,171 | A | * | 1/1978 | Bassignani | G01F 11/46 222/305 |
| 4,174,058 | A | * | 11/1979 | Bassignani | G01F 11/24 222/438 |
| 4,345,700 | A | * | 8/1982 | Souza | G01F 11/46 222/438 |
| 4,832,235 | A | * | 5/1989 | Palmer | A47G 19/24 222/370 |
| 5,271,535 | A | * | 12/1993 | Fridman | G01F 11/46 222/427 |
| 5,588,563 | A | * | 12/1996 | Liu | G01F 11/261 222/158 |
| 8,573,440 | B2 | * | 11/2013 | Wollach | G01F 11/023 222/1 |

* cited by examiner

*Primary Examiner* — Donnell Long

(57) ABSTRACT

The present invention is a device that is not only the top for a container of spice or other food additive, but it is also a measuring device to measure and then dispense the contained spice or food additive when such spice or other food additive is needed. The device has an indicator to show the amount of spice or other food additive to be measured and dispensed. The spice or other food additive can be premeasured and held in the device until needed.

19 Claims, 19 Drawing Sheets

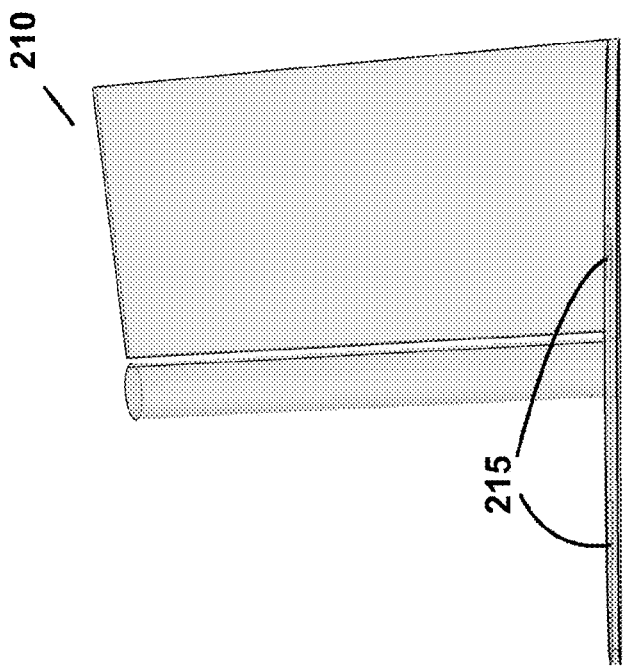
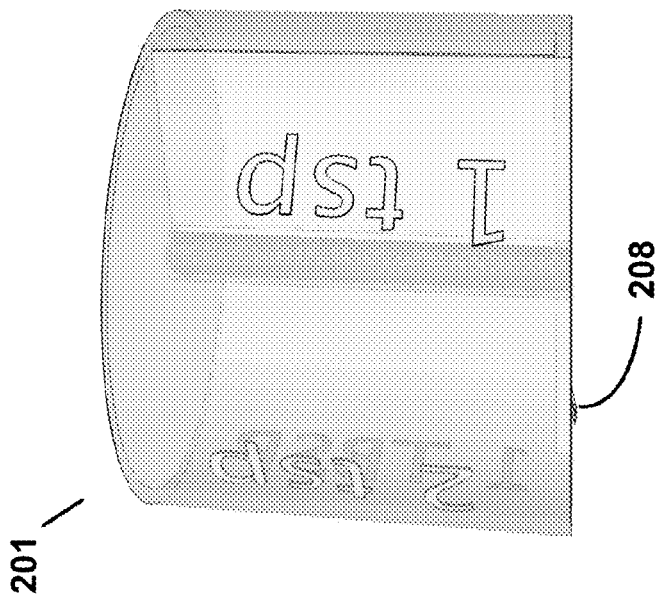
Figure 3
PRIOR ART

MEASURING AND DISPENSING CONTAINER TOP

CROSS REFERENCE TO RELATED APPLICATIONS

This application claims priority to U.S. Provisional Patent Application No. 61/829,817 titled "MEASURING AND DISPENSING CONTAINER TOP" that was filed on May 31, 2013 and that application is incorporated herein in its entirety by reference.

FIELD OF THE INVENTION

The present invention relates to containers for food products and more particularly to tops for containers of food products such as spices whereby the top can be used to measure and dispense specific amounts.

REFERENCE TO A SEQUENCE LISTING, A TABLE, OR A COMPUTER PROGRAM LISTING COMPACT DISK APPENDIX

Not Applicable.

REFERENCE REGARDING FEDERAL SPONSORSHIP

Not Applicable.

STATEMENT REGARDING FEDERALLY SPONSORED RESEARCH OR DEVELOPMENT

Not Applicable.

SUMMARY OF THE INVENTION

Dry powered food additives such as spices, sugars, salts, flavorings, and the like are a common ingredient in the preparation of food. These additives are dry, flowable materials that can consist of small dried flakes, fine powders, granules or other substances that can seem to flow when poured. A typical recipe may call for several such additives and each additive will typically be indicated with a measure of how much to include. In many home kitchens, a set of measuring spoons is a common tool. Too often, home chefs will find themselves having already used a particular measuring spoon that will have to be cleaned during the food preparation in order to be reused. Some chefs will measure out all of the spices to be used at the start of the food preparation process.

The present invention is a device that is not only the top to seal a container of spice or other food additive, but it is also a measuring device to measure and then dispense the spice or food additive contained therein.

Solving the need to have a container closure that would both measure and dispense the container's contents is a very old problem. U.S. patent by Zaloschan that issued as far back as Jun. 20, 1933 and is simply titled "Bottle Cap" and disclosed a "... closure for containers and is intended primarily for application to medicine bottles but is adapted to be applied to other containers from which it is desirable to discharge measured quantities of material." U.S. Pat. No. 3,207,371 by Stone that issued on Sep. 21, 1965 and is titled "Dispensing Device Containing Adjustable Metering Means," U.S. Pat. No. 7,451,901 by Ranney that issued on Nov. 18, 2008 and is titled "Metering and Dispensing Device," U.S. Pat. No. 7,959,031 by Ranney that issued on Jun. 14, 2011 and is titled "Method for Metering and Dispensing Device," as well as U.S. patent applications by Ranney such as US20070000953 titled "Metering and Dispensing Device" and US20090001104A1 titled "Method for Metering and Dispensing Device" all attacked the problem with a device having a continuously adjustable sized measuring chamber. Furthermore, the Ranney patents and applications had a complex sequence of steps to follow in order to measure and dispense the container's contents. U.S. Pat. No. 2,877,937 by Weir that issued on Nov. 1, 1957 and is titled "Measuring Dispenser" had a plurality of same sized compartments (or, in a variation, differently sized compartments) so that if "... another measured amount of material is required, the cap is additionally rotated ..." such that a previously filled "standby compartment" can be discharged. U.S. Pat. No. 6,601,734 by Smith that issued on Aug. 5, 2003 and is titled "Device for Measuring and Dispensing Free Flowing Materials" and U.S. Pat. No. 3,695,487 by Slayton et al. that issued on Oct. 3, 1972 and is titled "Dispenser Cap" both had a plurality of different sized chambers and an external marking on the device to indicate the size of the chamber being selected, but the number of measurable amounts was limited to a few predetermined chamber sizes. Other inventions were excessively complex, such as U.S. Pat. No. 2,363,747 by Reese et al. that issued on Nov. 28, 1944 and was titled "Lever Lock for Dispensing Devices" and which attempted to not only measure and dispense but also to count the dispensed liquid doses and lock the container. U.S. Pat. No. 3,308,995 by Lee et al. that issued on Mar. 14, 1967 and is titled "Dispensing Device" comprises a plurality of equal sized chambers whereby "... dispensing is achieved without multidirectional relative motion ..." but this device required the operator to count the number of compartments that are dispensed through the device. (Lee makes reference to "... the outer surface of the lip 63 and the shell 17 may be appropriately calibrated to advise the user of the amount of rotation required to dispense a given amount of the flowable material ..." however, this is all that is said and it must therefore be inferred, since the initial position of the shell would be unknown for any given dispensing operation, that dispensing a desired amount required specific knowledge of the workings of the device to orient the shell to some starting point whereby any calibration could be utilized.)

What is needed is a measuring container top for foods such as spices that is not significantly larger than the largest amount to be measured, that can seal or unseal the container, that can be set for a particular measured amount in advance of use, and that can dispense the measured amount. Ideally, the user would have to perform only two motions, the first being to simultaneously unseal the container and set the measure for the amount to be dispensed, and the second to simultaneously dispense that measured amount and reseal the container. The present invention meets these objectives.

BRIEF DESCRIPTION OF THE DRAWINGS

FIG. 3 depicts a different angle of the two primary components of a basic spice-top according to the prior art.

DESCRIPTION OF THE PREFERRED EMBODIMENT

Figure 1:
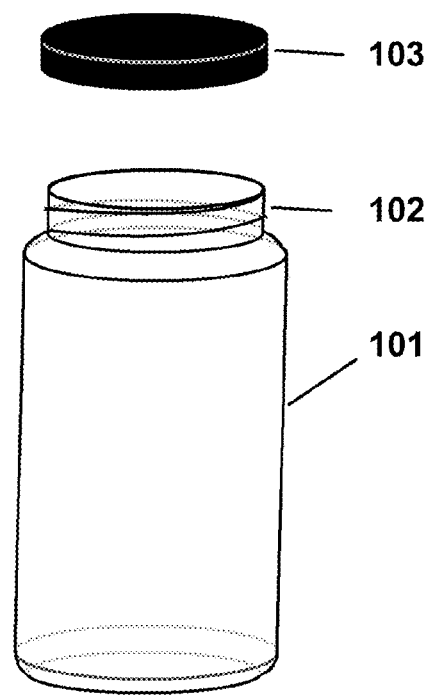
FIG. 1 depicts a typical container with lid for containing dry powered measurable substances.

The present invention is a device that is not only the top for a container of spice or other food additive, but it is also a measuring device to measure and then dispense the spice or food additive contained. The advantage to having a container top that can also measure and dispense the material contained is that one will never have to go find a separate measuring device (such as a measuring spoon), the measuring device will never have to be cleaned to enable it to be used to measure a second material having already been used to measure a first material, and a user can gather all of the spices called for by a given recipe and also pre-measure each of them at the start of a given food preparation without the need for bowls to hold the pre-measured amounts.

There are three things accomplished by the present invention. First, it is a top for a container. Such a container might hold dry powdered food additives such as spices, sugars, salts, flavorings, and the like to be used by a chef. Alternatively, such a container could hold other substances such as chemicals for a chemist or medicines for a pharmacist.

Second, it is a measuring device. Food substances such as spices are typically used in small measured amounts. Often these amounts are on the order of a few teaspoons or a tablespoon and can include fractional amounts. A tablespoon is the equivalent of three teaspoons and its volume is about 15,000 mm$^3$ (a teaspoon is therefore about 5,000 mm$^3$ and ⅛ teaspoon is about 625 mm$^3$). As a measuring device, the top must be able to separate a specific amount of the material contained within the container from the rest of the material still within the container.

Third, it is a holding device of the measured amount of food substance. Once measured, the specific measured amount of the material separated from the rest of the material still within the container must be held until ready for use. While this third function is optional (the measured amount could be allowed to spill from the measuring means as it is being measured or as soon as it is measured), it is a convenience that can be included with the first two functions without much added complexity or cost.

Other features can include a means to return a measured amount to the container in case of measurement errors or on-the-fly measurement changes or for refilling a container that is running low or is empty. Ideally, the device should be kept as small and compact as possible so that it is not top-heavy and so that it does not take up too much space. Additional features may enable the top to be reusable and washable or the top can be for one-time use (for example, a snap-on top to enable a spice vendor to provide such a device with the packaging of their product knowing that it will be disposed of before any of the components might wear out or break thereby enabling lower cost components to be used).

For the sake of simplicity, the present discussion will at times refer to the present invention as a spice-top and to the measured material as dry powered spice or, simply, spice; this is not to detract from the possibility of using the present invention in other implementations and with other substances. The present discussion will first describe a basic spice-top to illustrate the basic mechanisms and provide a general understanding of the present invention. This description is followed by a discussion of the limitations of that basic spice-top. A preferred embodiment of the present invention is thereafter described.

FIG. 1 depicts a typical container for storing spices. This container is typically a glass or plastic body 101 (i.e., a small jar) with a threaded top neck 102 to which a metal or plastic lid 103 can be screwed thereon to secure and contain the material therein. The opening of the container 101 can be thought of as being a plane defining a boundary between the interior of the container and the exterior of the container.

Devices having some of the basic features of the present invention are depicted in FIGS. 2 through 6 and, as described in the Summary of the Invention paragraphs above, exist in the prior art.

Figure 2:
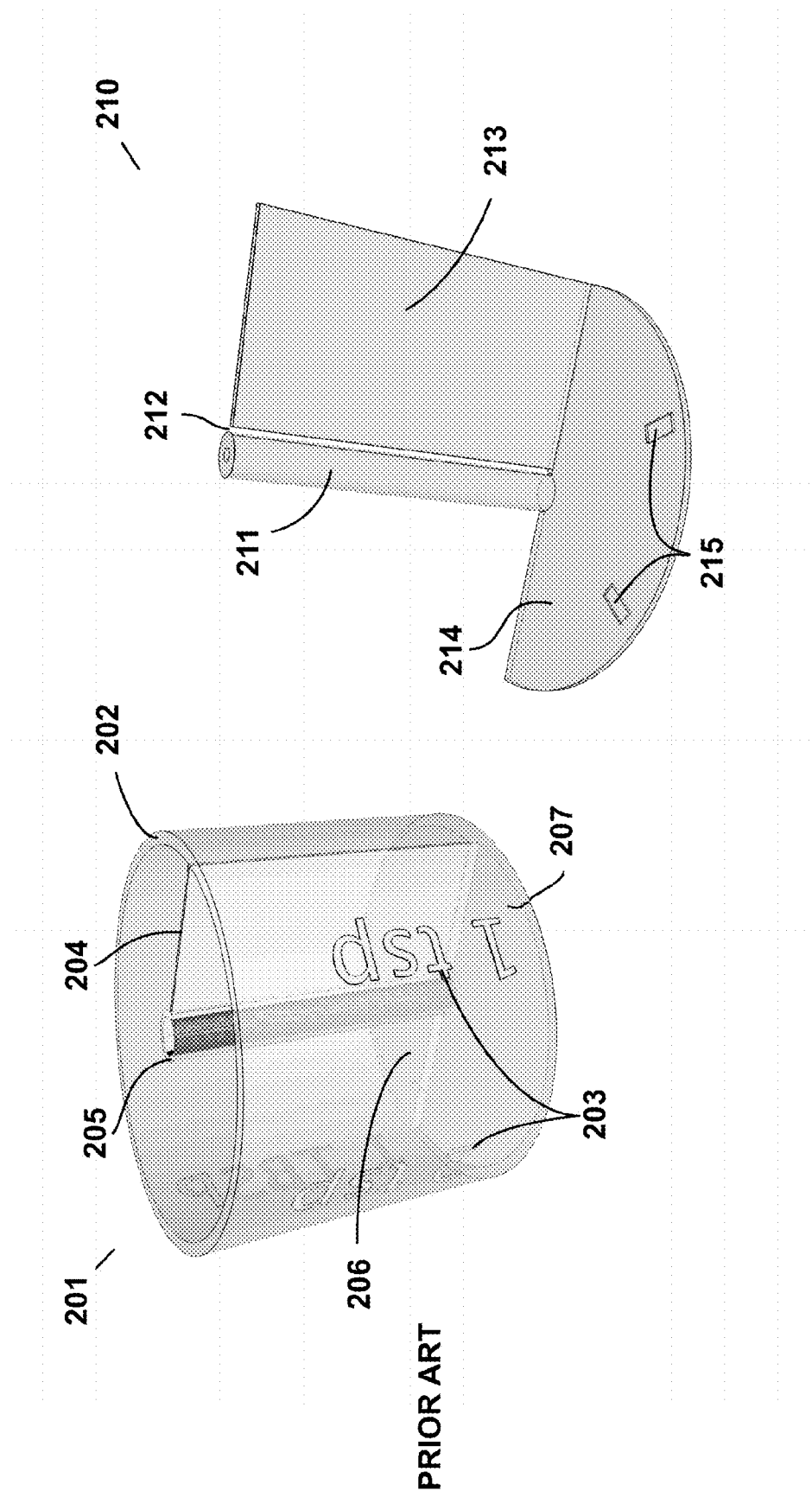
FIG. 2 depicts the two primary components of a basic spice-top according to the prior art.

Referring to FIG. 2, a basic spice-top is depicted. The body of the spice-top 201 has an outer shell 202 defining its maximum internal volume. This outer shell may be made of a clear material, such as plastic or glass, with measurement identifiers 203 formed thereon. This basic spice-top also has a floor 206 to prevent the spice from entering (from below) the spice-top outside of the volume that is set for a given measure of spice. Floor 206 covers about half of the bottom of body 201 while the other half of the bottom of body 201 has an opening 207. This basic spice-top has an immovable inner wall 204 that is attached to floor 206 and between the outer shell 202 and a central tube 205. This immovable inner wall 204 acts as one of the surfaces to contain the volume of material to be measured.

A second component 210 is a movable insert that enables setting a volume equal to the measure of spice. Movable insert 210 has a hollow shaft 211 that is inserted inside central tube 205 from below (gap 212 allows a space for the wall of tube 205). The floor 214 will come against the bottom of central tube 205 to correctly position second component 210 within body 201 such that when second component 210 is rotated within central tube 205, floor 214 will be in contact with floor 206 as it slides below it. Movable insert 210 also has a wall 213 which moves relative to immovable inner wall 204 and acts a second surface to contain the volume of material to be measured (when movable insert 210 is positioned within body 201, wall 213 must be positioned within opening 207). The floor 214 of movable insert 210 also has indentations 215 therein; these indentations are part of a mechanism, described below, that enable the spice-top to click into place for each pre-set measure (the present example, for the sake of clarity and simplicity in the present discussion, depicts only three measures—1 teaspoon, 2 teaspoons and one tablespoon—but could include more or fewer click-positions for more or fewer pre-set measures, respectively). Typically, movable insert 210 would be made of a brightly colored or other material that is easily visible through the outer shell 202 of body 201. As can be seen in FIG. 3 (a slightly different angle of the view depicted in FIG. 2), a small flexible arm 208 protrudes out of floor 206 and can engage one of the indentations 215 such that as movable insert 210 is rotated within body 201, certain points of the rotation will snap into place; these snap-points correspond to pre-set volume measures of the device.

Figure 4:
FIG. 4 depicts the two primary assembled components of a basic spice-top according to the prior art.

As depicted in FIG. 4, a measurement is selected by rotating movable insert within the body 201 such that immovable inner wall 204 and wall 213 form a pie-shaped wedge (the measured volume 401 is also bounded by the portion of outer shell 202 between the outer edges of immovable inner wall 204 and wall 213). The volume is determined by first calculating the area A of the footprint of the wedge. If the radius (to the inside surface) of the body 201 is $r_b$ and the radius (to the outside surface) of central tube 205 is $r_t$, then the area $A_{fw}$ of the footprint of the wedge can be found as:

$$A_{fw} = \pi(r_b^2 - r_t^2)\theta/360$$

where $\theta$ is the angle (in degrees) between immovable inner wall 204 and wall 213 and the volume of the measure $V_m$ is equal to $A_{fw}$ multiplied by the height $H_b$ of body 201. The volume of the measure is therefore:

$$V_m = \pi H_b(r_b^2 - r_t^2)\theta/360$$

To illustrate, if the radius (to the inside surface) of the body 201 is 15 mm and the radius (to the outside surface) of central tube 205 is 2 mm, then the area of the footprint when the immovable inner wall 204 and wall 213 are at an angle of 60° is found as:

$$A_{fw} = \pi(15^2 - 2^2)60/360 = 115.7 \text{ mm}^2$$

If it is desired that this 60° angle setting of immovable inner wall 204 to wall 213 should correspond to a measure of 1 teaspoon (which is equal to a volume of about 5000 mm³), then the height of body 201 must be approximately 43.2 mm:

$$H_b = 5000 \text{ mm}^3/A_{fw} = 5000 \text{ mm}^3/115.7 \text{ mm}^2 \approx 43.2 \text{ mm}$$

Figure 5:
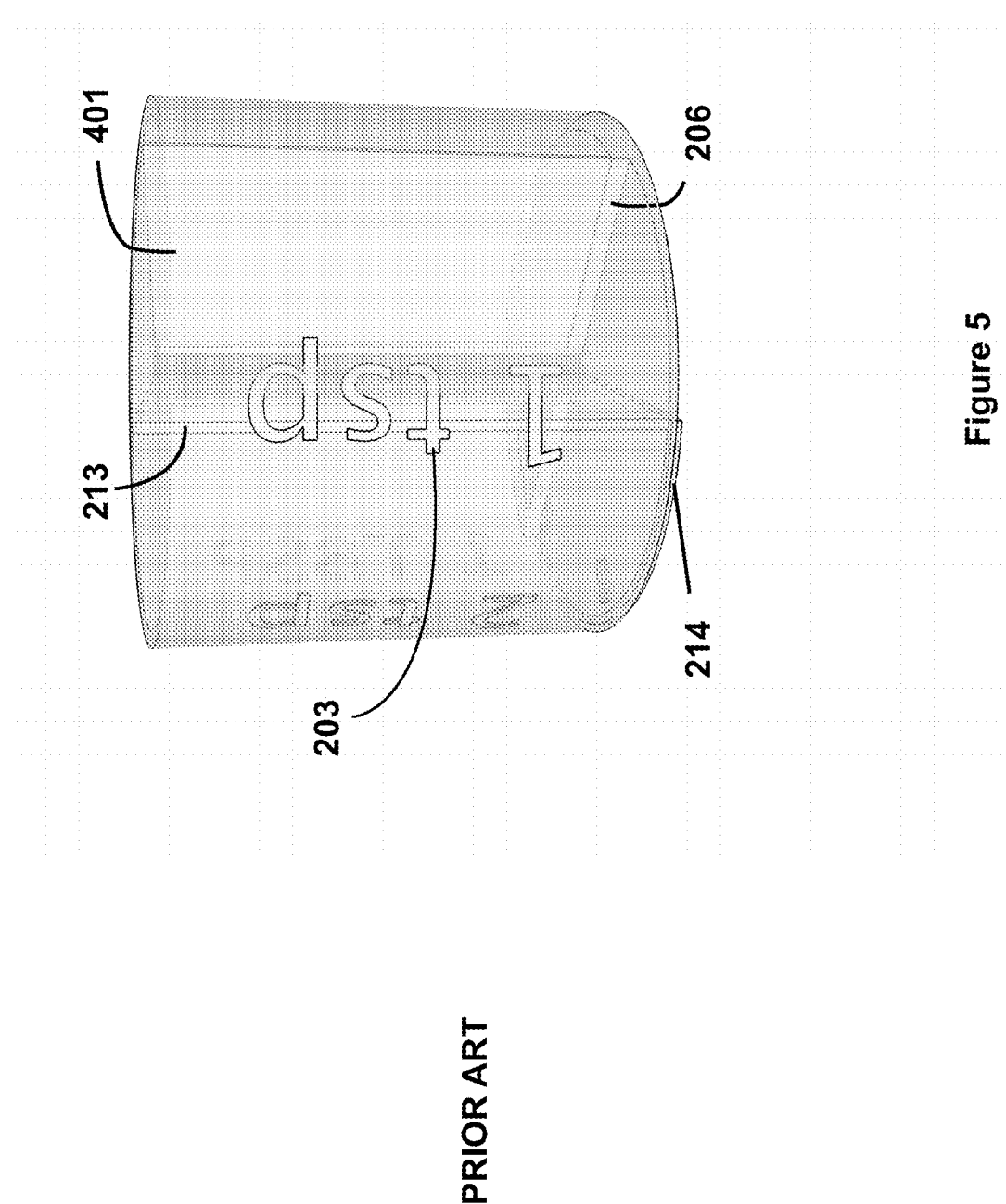
FIG. 5 depicts a different angle of the two primary assembled components of a basic spice-top according to the prior art.

A slightly different angle of the view of this assembly as depicted in FIG. 4 is depicted in FIG. 5 wherein the combination of floor 206 and floor 214 can better be seen to cover all of the bottom of body 201 except for the bottom of measured volume 401. It should also be apparent from FIG. 5 why it is suggested that body 201 should be made of clear material and why movable insert should be made of a brightly colored material—the edge of wall 213 acts as an indicator-line behind measurement identifier 203; in operation, a user of the device would turn movable insert 210 such that the edge of wall 213 clicks into place behind the measurement desired.

Figure 6:
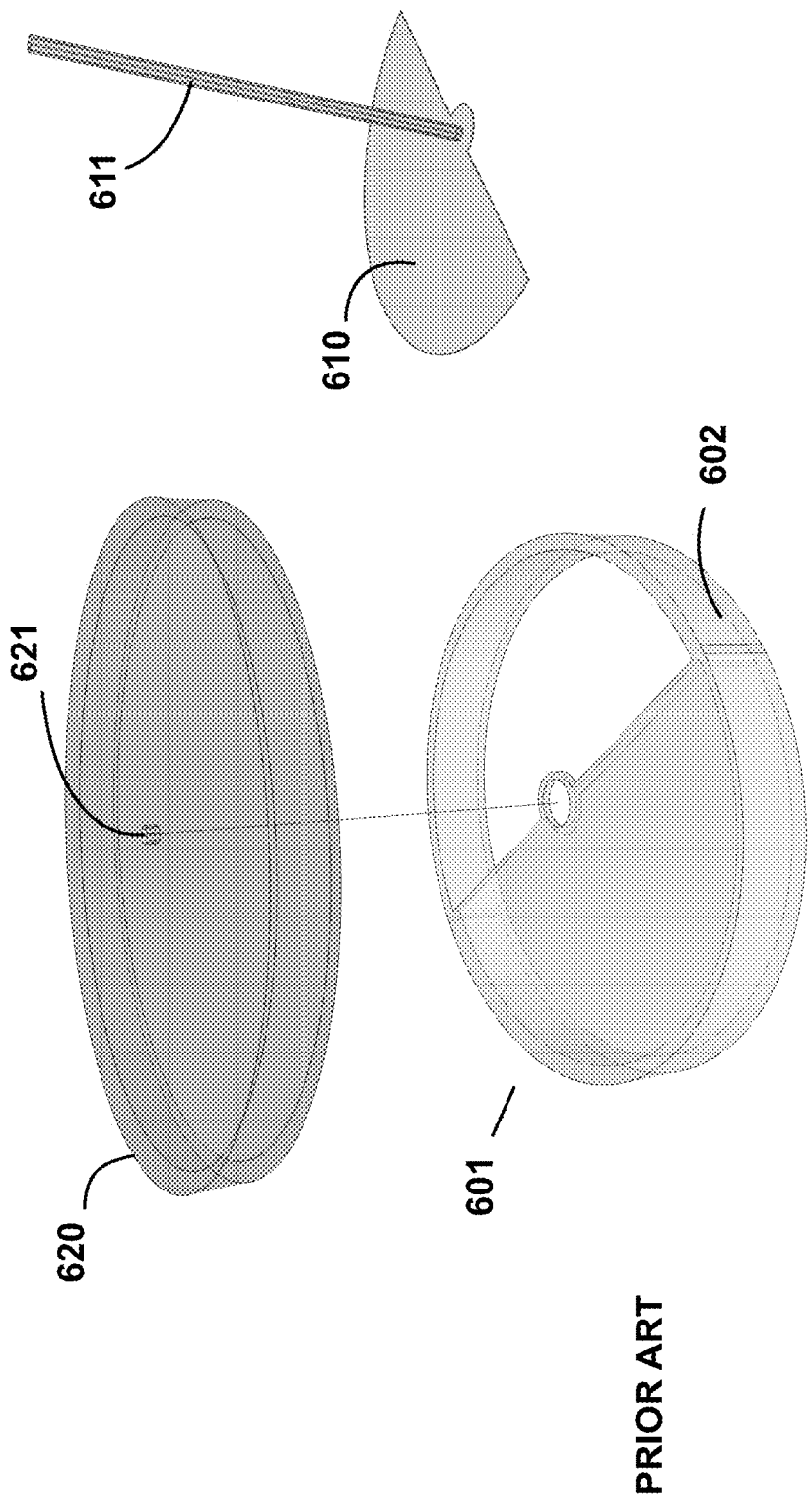
FIG. 6 depicts the additional components of a basic spice-top according to the prior art.

In addition to the above described components of this basic mechanism, three additional components would be included (see FIG. 6). The first additional component 601 is affixed to the top edge of hollow shaft 211 and wall 213 and extends out to a grip-ring 602 that hangs down around the top edge of body 201. This first additional component enables the user to grasp the grip-ring 602 in order to rotate the movable insert 210 to the desired measure.

The second additional component is a half circle 610 that can be rotated to cover the opening 207 of body 201 from below; this half circle is connected to a solid shaft 611 that runs through the center of hollow shaft 211. This second additional component enables the user to rotate the half circle 610 by grasping and rotating the end of the solid shaft 611 so as to either cover or uncover the bottom opening 207 of volume 401. A snap-on (or screw on) cap 620, having a hole 621 in its center to just large enough allow the solid shaft 611 to pass through it, keeps the interior of the spice-top free of dust.

Figure 7:
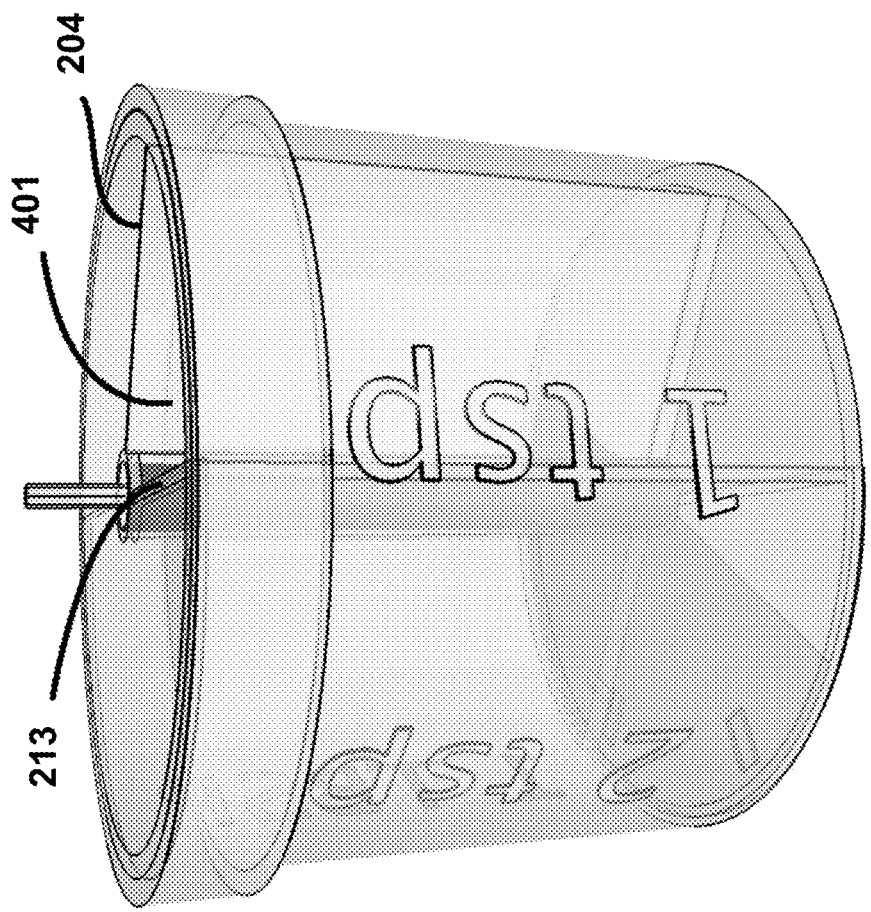
FIG. 7 depicts the assembly of the components of a basic spice-top according to the prior art.

FIG. 7 depicts the assembled basic device (with cap 620 removed). In addition to this assembly, there will be a bottom ring that is attached to the bottom of body 201 having an internal thread to match the threads found on the neck 102 of various standard containers 101 such that the spice-top can replace the regular metal or plastic tops 103 of those various standard containers 101. Alternatively, there could be a snap-on sleeve for permanently attaching the top to a container.

To operate the device, a user would (a) rotate the solid shaft 611 until the half circle 610 uncovers the bottom of volume 410 exposed through opening 207 of body 201. The user would then (b) turn the grip-ring 602 to select the desired measure by clicking the edge of wall 213 into place behind the measurement identifier 203 corresponding to that desired measure. (Note that steps a and b could be reversed.) Next, the spice-top is (c) turned upside-down thereby allowing the spice in the container to spill into measured volume 401 (note that no spice is dispensed because the snap-on cap 620 is blocking the top of measured volume 401). Next, while the container is still upside-down, (d) the solid shaft 611 is rotated until the half circle 610 covers the bottom opening of volume 410 exposed through opening 207 of body 201 (this will prevent the spice from falling back into the container when the container is returned to its upright position). Finally, (e) the container is returned to its upright position; when the measured amount of spice is needed, the snap-on cap is removed to dispense the measured amount of spice that is contained within measured volume 401.

The basic mechanisms of the present invention should now be understood. There is a chamber (measured volume 401) that is adjustable for different sized measures. There is an indicator to make a selected measured volume visible to the user (the edge of wall 213 behind the measurement identifiers 203). There is a mechanism to prevent the user from accidentally selecting an in-between measure (the click mechanism of arm 208 along with indentations 215). There is a mechanism to prevent spice from being dispensed until the user is ready for it (the snap-on cap) and there is a mechanism to capture the spice in the measuring chamber and to prevent more spice from entering the measured volume while the spice is being dispensed (the half circle). There are one or more mechanisms to enable the user to operate the device (the grip-ring to set the size of the measure and the end of the solid shaft to control the flow of spice between the container and the measuring chamber).

It will be obvious that in this basic version and as is an issue in the prior art, the user will have to become familiar with the operation of the device in order to use it correctly. It will also be obvious that in this basic version and as is an issue in the prior art, the device is excessively tall because a significant portion of the device (the volume above floor 206) is always empty.

The present invention in a preferred embodiment improves upon the mechanisms of the basic version as outlined above while simplifying the operation of the device for the user. It also utilizes the entire volume of the device for measurement thereby cutting the height of the device in half. This makes the device as small and compact as possible so that it is not top-heavy and so that it does not take up too much space and so that it is more likely to enable a container fitted with the spice-top to fit into an existing or standard spice rack. A preferred embodiment of the present invention also replaces the continuously adjustable measuring volume of the prior example with a incrementally adjustable measuring volume made up of multiple separate pre-measured chambers for improved measurement accuracy.

Figure 8:
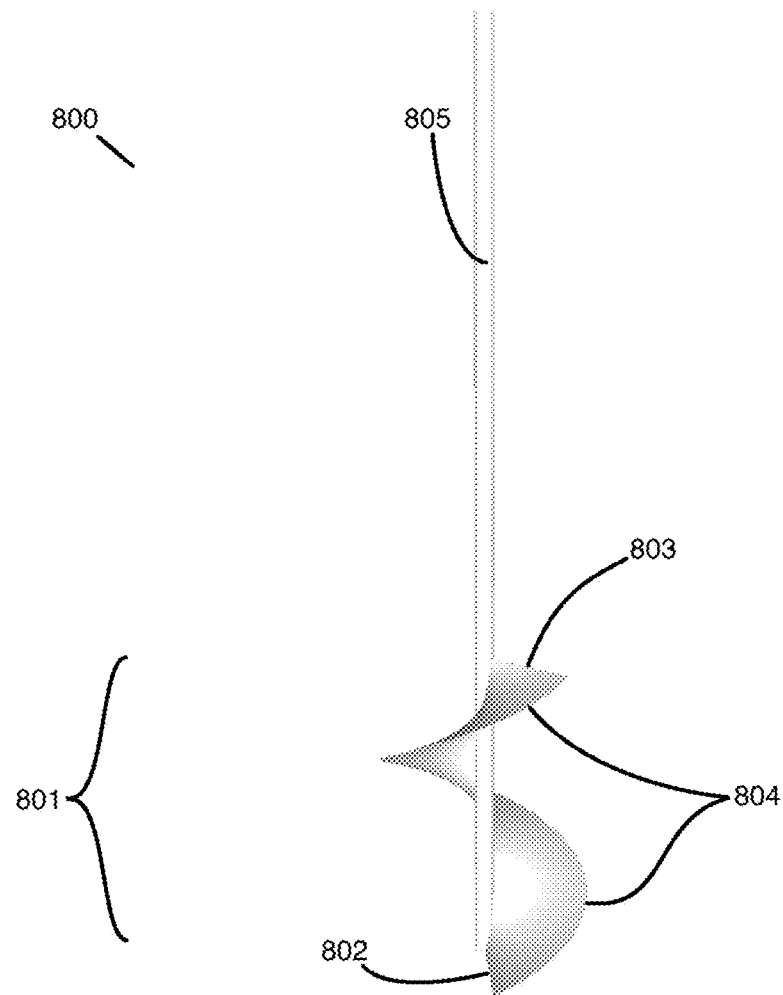
FIG. 8 depicts the blade component of a spice-top according to a preferred embodiment of the present invention.

We now discuss a preferred embodiment of the present invention, referring initially to FIG. 8. In the preferred embodiment, the functionality of floors 206 and 214, half circle 610, wall 204, movable wall 213, and shaft 611 are all comprised by a single blade component 800. Blade 801 is a spiraling blade whose leading edge 802 is 405° rotated from its trailing edge 803. Blade 801 is attached to a shaft 805. This spiral rotation of 405° comes from one full rotation (360°) plus a partial rotation corresponding to the angular measure of one of a plurality of evenly sized, premeasured chambers.

Figure 9:
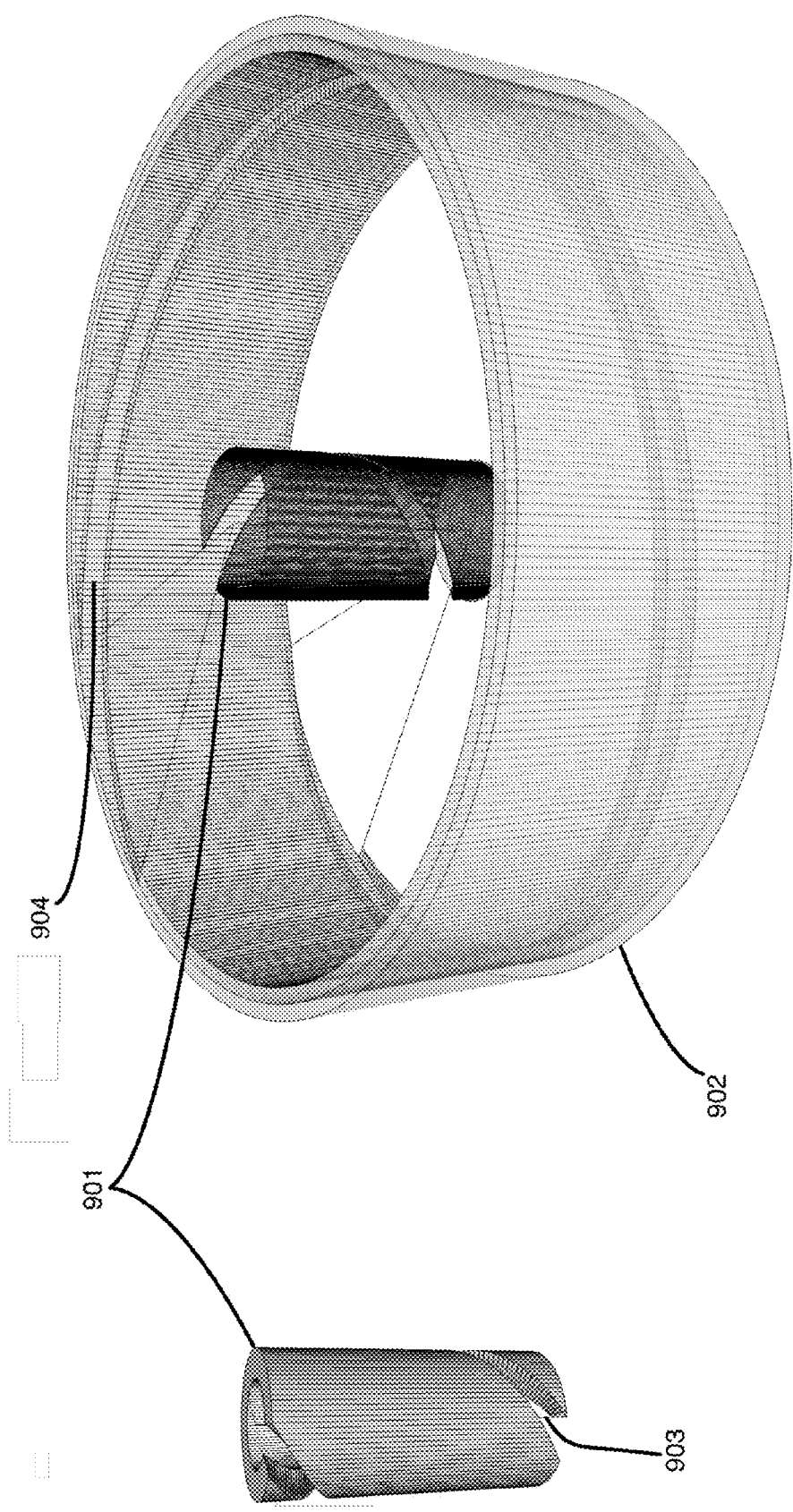
FIG. 9 depicts a layer of the hub and ring of a spice-top according to a preferred embodiment of the present invention.
Figure 10:
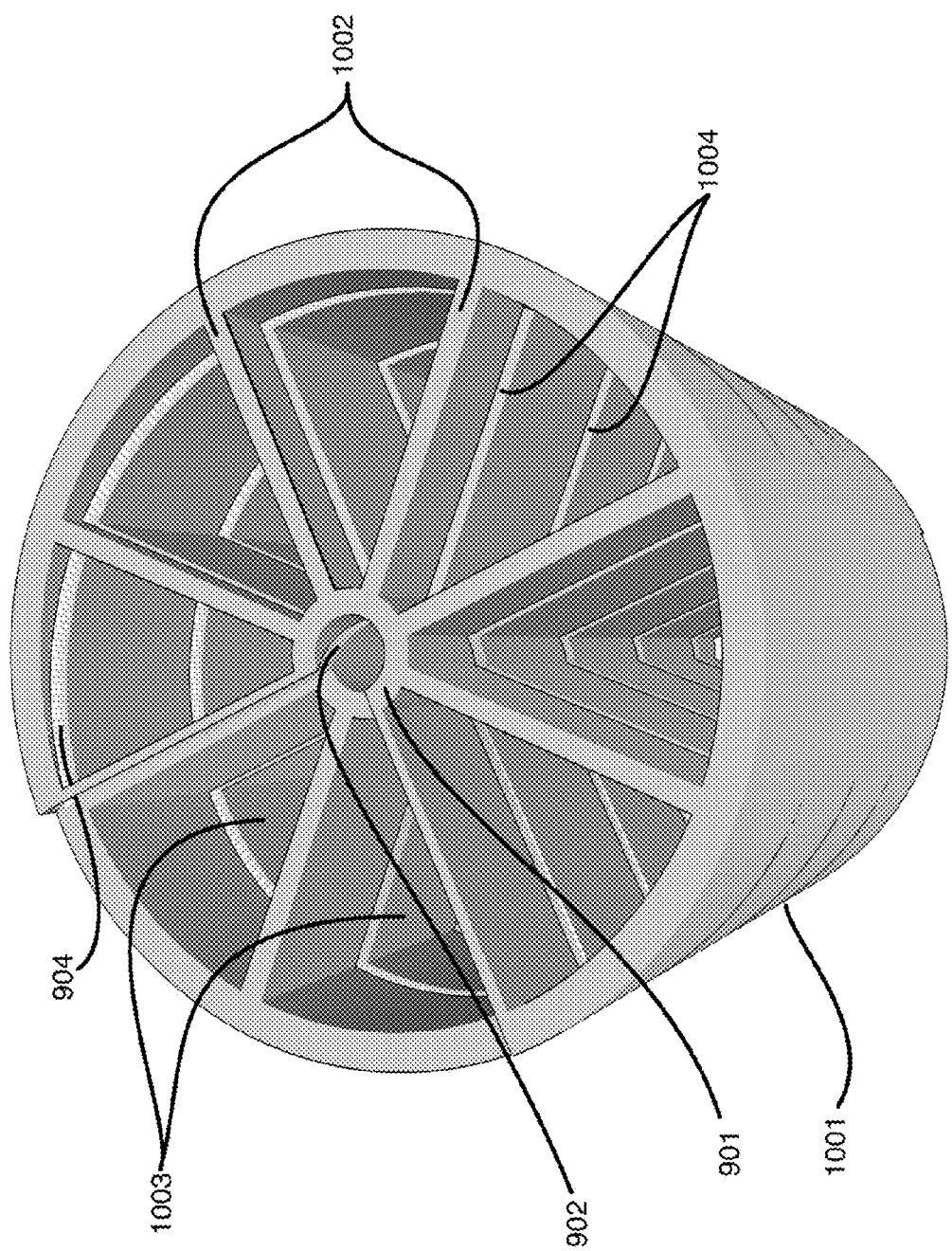
FIG. 10 depicts the body of a spice-top showing the chamber divider walls and spiral track according to a preferred embodiment of the present invention.

FIG. 9 depicts a portion of the spiral hub 901 that forms the central core and a portion of the spiral ring 902 that forms the outer shell of the body of the present example of the preferred embodiment. FIG. 10 depicts the full body 1001 of the present example of the preferred embodiment also showing the walls 1002 separating the individual stacked chambers 1003.

The outer edge 804 of blade 801 fits into and follows the outer track 904 in body 1001 (made from layers of spiral rings 902); the shaft 805 of blade 801 fits within central hub 901 with the blade 801 passing through inner track 903. Walls 1002 have openings 1004 between inner track 903 and outer track 904 to allow blade 801 to pass through. As blade 801 passes through these chambers and walls, it will block material from passing through the body of the device. However, because the blade 801 spirals more than 360° (or more precisely, because blade spirals the rotational distance of one additional chamber more than) 360°, one chamber will be blocked both from above and below. This will ensure that if the blade 801 is rotated such that its leading or trailing edge is partway across a given chamber opening, the material cannot pass around both edges and through the body of the device. (More rotational distance in the length of the blade will cover additional chambers and will still block the through path of the material however less rotational distance in the length of the blade by more than the thickness of the chamber dividing walls will enable material to seep through and should be avoided.)

In operation, when the leading edge 802 of blade 801 is roughly flush with the bottom of body 1001, the device is considered sealed. As the blade is rotated (i.e., unscrewed), the blade 801 will move outward (i.e., away from the container) to expose the bottom openings of successive chambers to the container below. A particular measure is selected by rotating the blade until the total volume of chambers corresponding to the desired measure is exposed to the container below, plus one additional chamber; this simultaneously unseals the container. An amount of material is dispensed by inverting the container thereby allowing the material to fill the volume of the chambers exposed when the measure was selected, and then, while the container is still inverted, rotating the blade back to its original sealed position.

For example, to dispense a measure (from a device wherein a chamber is $\frac{1}{8}^{th}$ of a rotation) corresponding to a single chamber's volume, the blade would initially be turned 90°. When the material is to be dispensed, the container with the device thereupon is inverted—this will fill the bottommost two chambers. While the container is still inverted, the blade is rotated back. As the blade reaches the 45° point, no material is dispensed because of the overlapping ends of the blade, but as the blade continues to its original position, the contents of all (i.e., one chamber) but the bottommost chamber is dispensed. To prevent a single unit measure of material from remaining in this bottommost chamber, the wall of the one chamber closest to the leading edge of the blade when the blade is in its sealed position is absent.

In the present example of the preferred embodiment, the volume of the device is divided into eight separate pre-measured chambers for improved measurement accuracy, with each chamber having an angular measure of $\frac{1}{8}^{th}$ of a full rotation, or 45° (360°+45°=405°). If the chambers were not all the same size, the additional partial rotation of the blade 801 would have to correspond to the angular measure of the largest of the premeasured chambers.

The vertical distance between the ends of the blade 801 where they overlap is determined similarly to the way in which the height of body 201 was determined, above. As calculated above, if the radius (to the inside surface) of spiral ring 902 is 15 mm and the radius (to the outside surface) of spiral hub 901 is 2 mm, then the area of the footprint of each chamber when there are eight chambers, resulting in the walls of each chamber being at a 45° angle (ignoring the thickness of the walls), is:

$$A_{fw} = \pi(15^2 - 2^2)45/360 = 86.8 \text{ mm}^2$$

If it is desired that each of the chambers should hold a measure of ⅛ teaspoon (which is equal to a volume of about 625 mm³), then the height of each chamber (i.e., the vertical distance between the portions of the blade 801 where the leading edge 802 and trailing edge 803 overlap) must be approximately 7.2 mm:

$$H_b = 625 \text{ mm}^3/A_{fw} = 625 \text{ mm}^3/86.8 \text{ mm}^2 \approx 7.2 \text{ mm}$$

For a spice-top capable of measuring up to a tablespoon in increments of ⅛ teaspoon, at least three layers of spiral ring 902 will be necessary (because one tablespoon equals three teaspoons) and the spice top will have to be about 21.6 mm tall. This would provide for 24 chambers of ⅛ teaspoon each in three spiraling layers.

Figure 11:
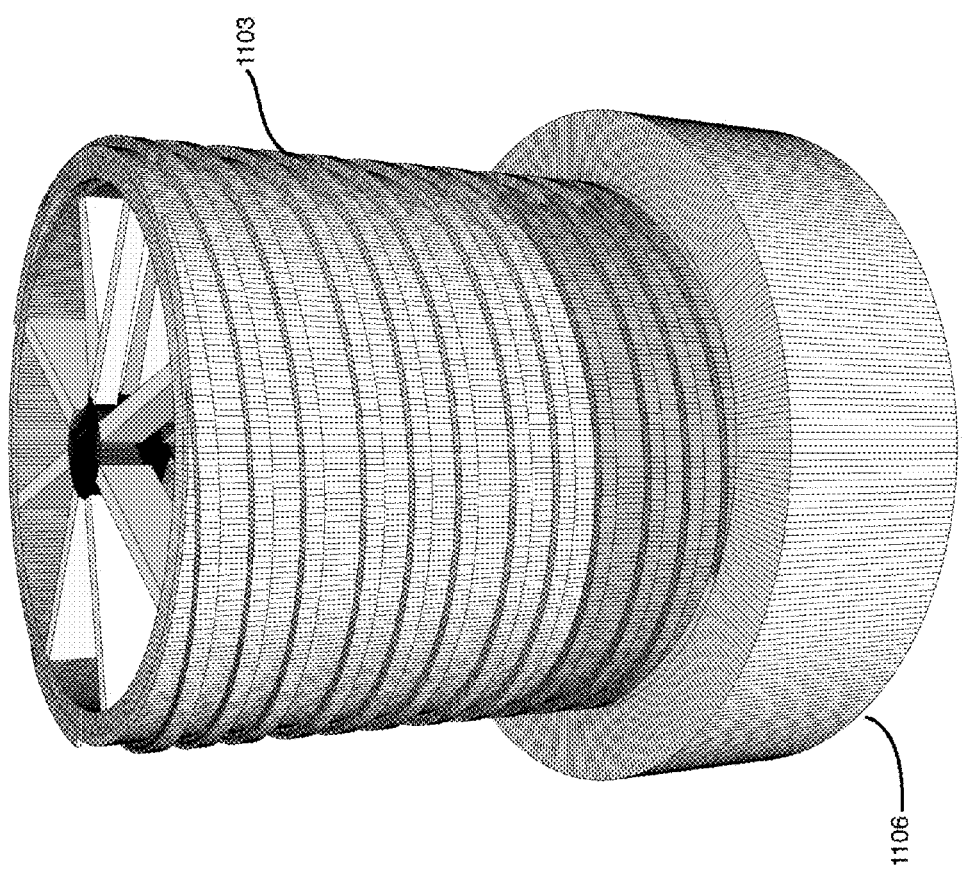
FIG. 11 depicts the body of a spice-top showing the outer wall spiral track according to a preferred embodiment of the present invention.

A preferred embodiment of the invention, will also include a cover portion 1101 (the exterior surface of which acts as the grip ring) to which the blade shaft 805 is internally attached. As shown in FIG. 11, an additional spiral track 1003 in fabricated on the exterior of body 1001. This spiral track 1003 mates with a spiral groove on the inner surface of cover portion 1101 to better facilitate the raising and lowering of cover portion 1101 as it is rotated—this spiral groove matches the internal spiral of the blade such that the raising and lowering of the blade assembly 800 will match the raising and lowering of the cover portion 1101. An indicator window 1104 is provided for viewing the desired measure (a measurement indicator 1105 is printed, embossed, or otherwise attached to the surface of the body 1001 corresponding to each chamber measurement position) such that as the top portion is rotated and raised or lowered, the appropriate measure will be displayed through the opening 1104. The lid will also comprise an opening 1102 to keep dust out of the device as well as a click stop mechanism as is well understood by those skilled in the art and as is described above for the basic spice top. The lid's surface is convex such that the material will tend to flow towards the opening when the device is inverted and such that the material can be better directed as it is being dispensed. Finally, a screw ring 1106 that matches the size and screw thread of the jar lid 103 of the spice container 101 on which the present invention is to be used such that the present invention can simply be screwed onto that jar as a jar lid replacement.

A variation on the preferred embodiment is depicted in FIG. 13 through FIG. 18. In this variation, the device is smaller in the vertical direction, but may be more costly because it requires that more parts be assembled during manufacture. In this variation, the cover portion (refer to 1101) rises and lowers on a threaded (refer to 1103) exterior of the device's body (refer to 1001) by mating with a spiral groove on the inner surface of that cover portion (refer to 1101) as it is rotated. But in this variation, the slope of these spiral tracks is less steep such that the cover portion rises and lowers to a lesser extent for each revolution; this rising and lowering must only be sufficient to position the measure viewing window (refer to 1104) above any measure indicator (refer to 1105) from a prior or subsequent revolution such that only one measure indicator is visible through the measure viewing window at any time.

Figure 13:
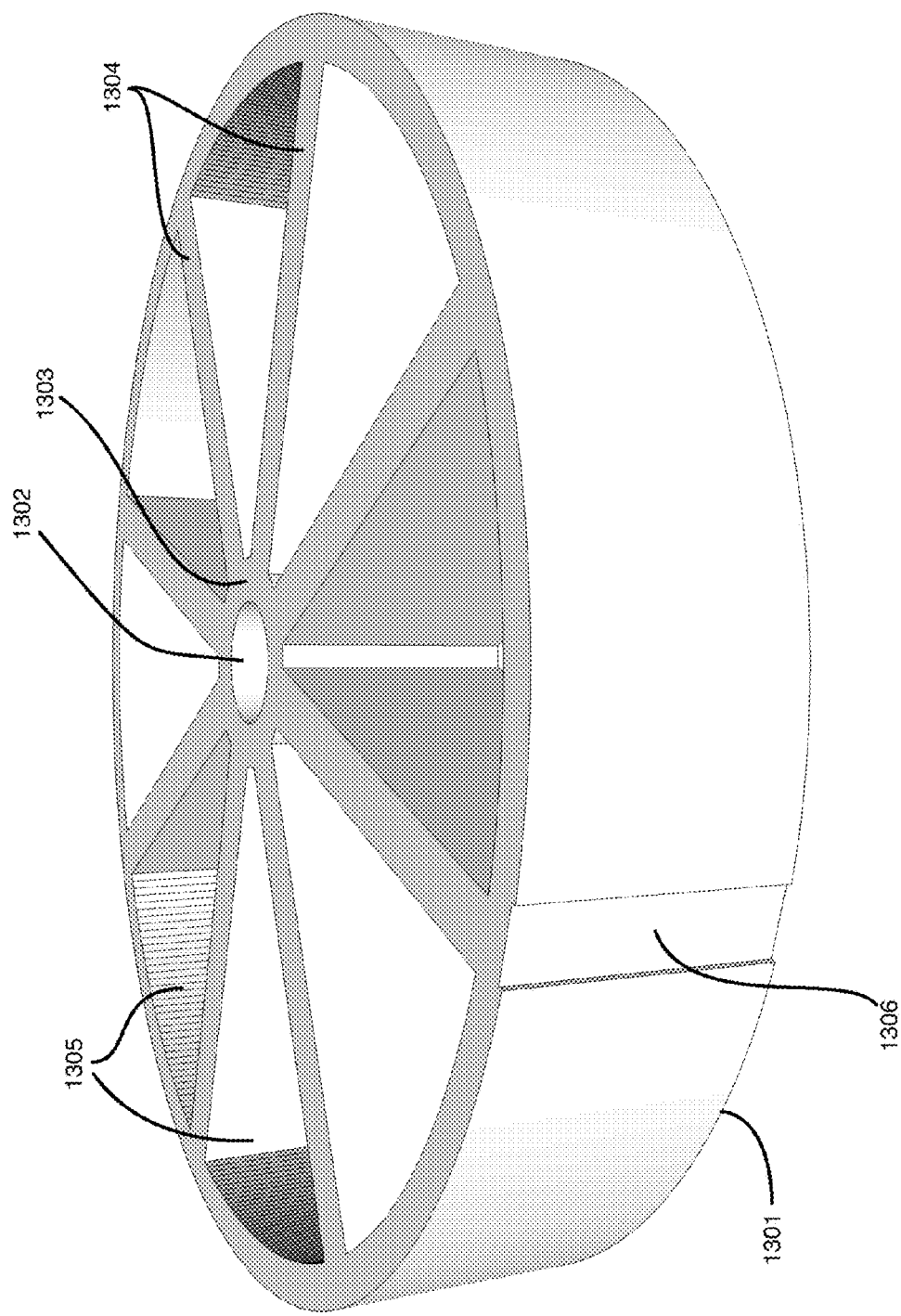
FIG. 13 depicts the chambers ring according to a first variation of the preferred embodiment of the present invention.
Figure 14:
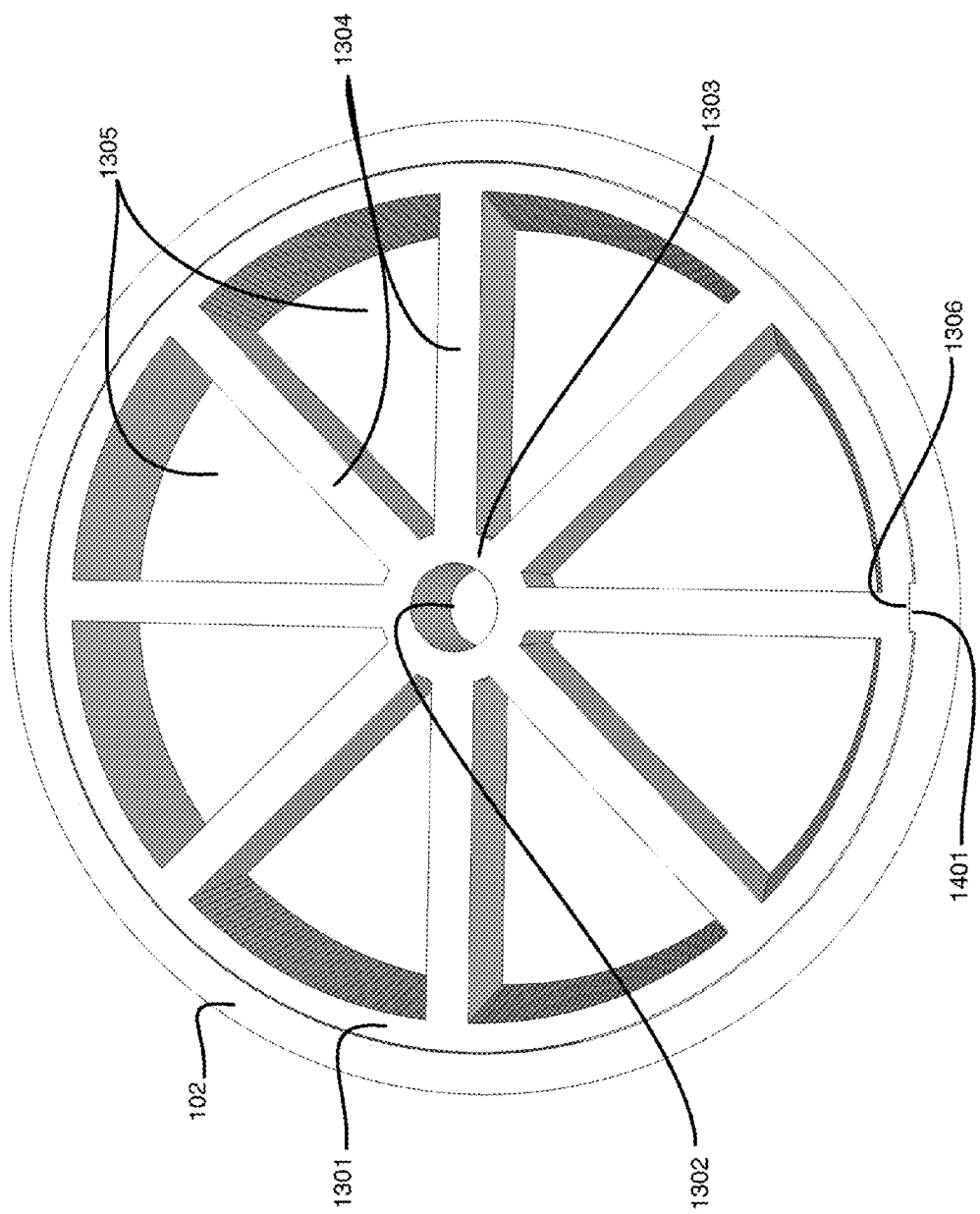
FIG. 14 depicts an alternate view of the chambers ring according to a first variation of the preferred embodiment of the present invention.

A first part in this variation, as depicted in FIG. 13, is a chambers ring 1301. This part is similar to the body 1001 of the preferred embodiment in that it has chambers 1305 formed by dividing walls 1304 that converge into a central hub 1303 in which there is a center hole 1302. The angles of the walls 1304 are determined in the same manner as they were for body 1001. The height of the chambers ring 1301 is likewise determined in a similar way such that each of the chambers has a known volume (for example, ⅛ teaspoon). As depicted in FIG. 14, this chambers ring 1301 can be inserted into the opening of the jar neck 102 of jar 101 (refer to FIG. 1) and can be kept from rotating when the cover portion is turned by having a key 1401 protruding from the inner wall of the jar neck 102 such that it mates with a slot 1306 in the outer wall of chambers ring 1301.

Figure 15:
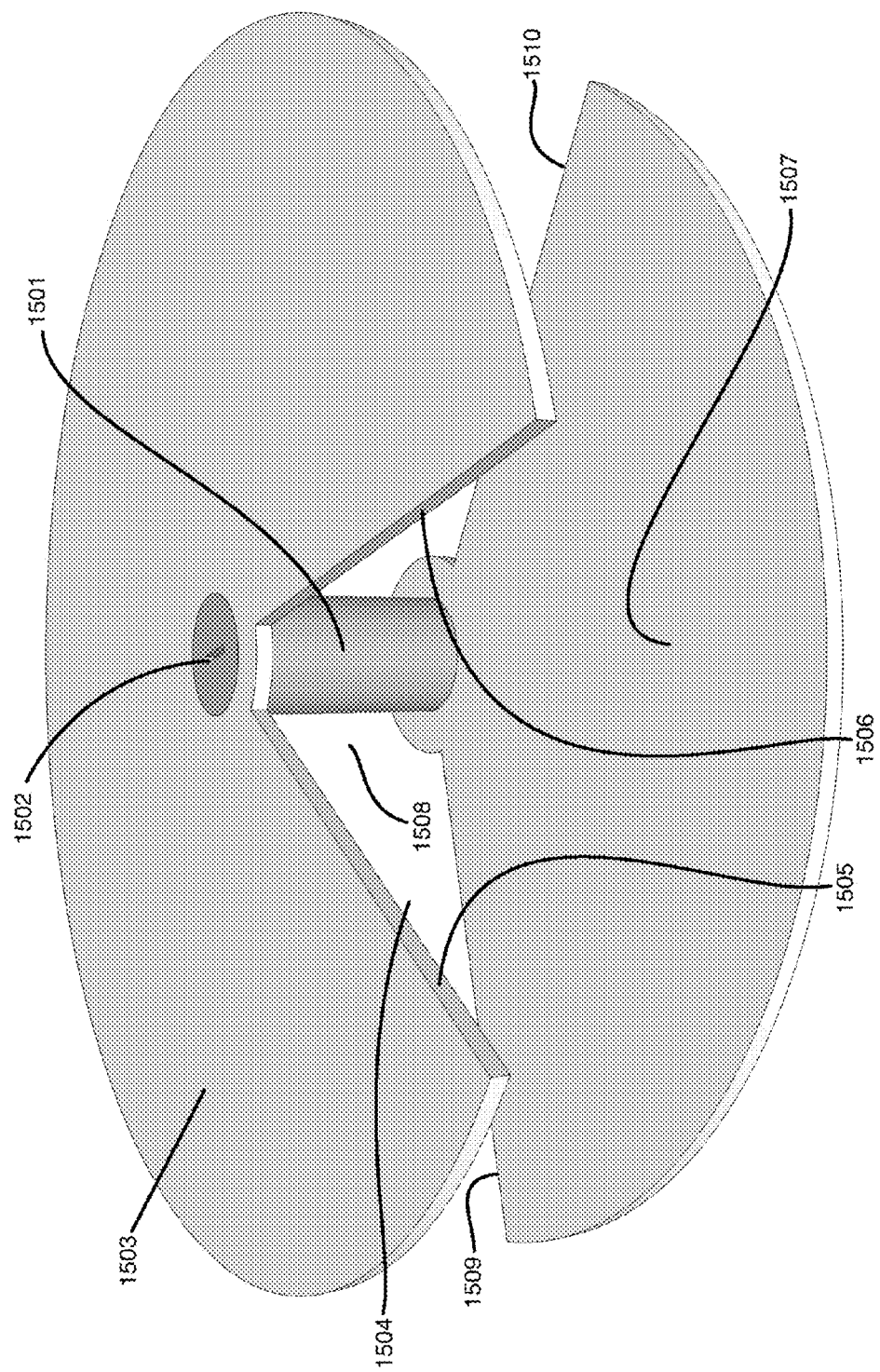
FIG. 15 depicts the blade assembly, or chamber blocking device, according to a first variation of the preferred embodiment of the present invention.

FIG. 15 depicts a blade unit that is a second part that is formed from three components: a top plate 1503, a bottom plate 1507, and a hub 1501. This part is a chamber covering device that could comprise three separate pieces, it could comprise two pieces (one piece consisting of one of the plates and the other piece consisting of the combination of the other plate and hub formed as a single piece), or it could be formed as a single piece (in which case the chambers ring 1301 would have to be formed as two halves or be split such that this one piece could be assembled with its hub 1501 running through the center hole 1302 of chambers ring 1301, as will be described below. However this part is created, the top plate and the bottom plate will move together during operation. The top plate 1503 will have an opening 1504 bounded by edge 1505 and edge 1506. The bottom plate 1507 will have an opening 1508 bounded by edge 1509 and edge 1510. This blade unit performs the same function as the spiral blade 801 whereby the function of the first portion (or the leading portion 802) of the spiral blade is performed by the bottom plate and the function of the second portion (or the trailing portion 803) of the spiral blade is performed by the top plate.

The sizes and positions of opening 1504 and opening 1508 are as follows. Opening 1504 of top plate 1503 is roughly the same size as one of the chambers from the plurality of chambers 1305. Edges 1505 and 1506 of the opening in top plate 1503 will generally align with the centerlines of the dividing walls 1304 on either side of a given chamber. Opening 1508 of bottom plate 1507 is roughly the same size as three adjacent of the chambers from the plurality of chambers 1305. Edges 1509 and 1510 of the opening in bottom plate 1507 will generally align with the centerlines of the outer dividing walls 1304 of the two outer chambers of the three adjacent of the chambers from the plurality of chambers 1305. When assembled as depicted in FIG. 15 and aligned such that top plate 1503 completely covers all but one of the plurality of chambers 1305, the bottom plate 1507 will cover the lower openings of three of the plurality of chambers 1305; specifically, the one chamber having its upper opening uncovered by top plate 1503 will have its bottom opening covered by the center third of bottom plate 1507 (i.e., this one chamber as well as the single chamber on either side of this one chamber will have its lower opening covered by bottom plate 1507).

Figure 16:
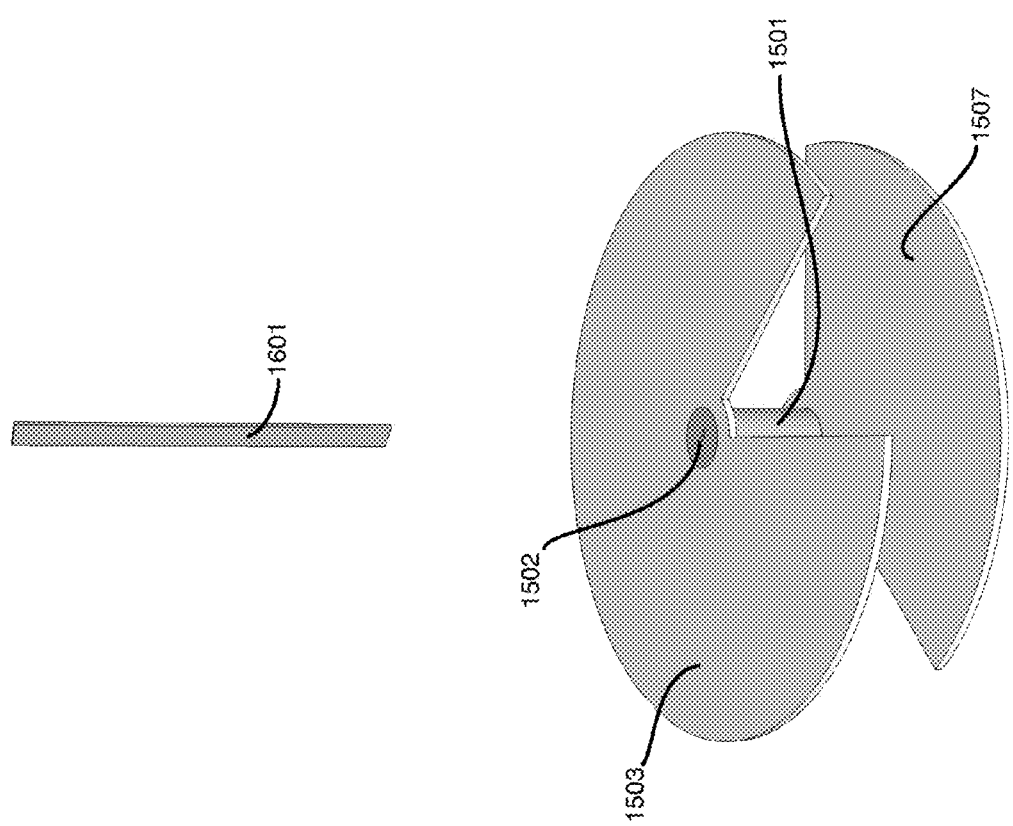
FIG. 16 depicts the blade assembly, or chamber blocking device, along with the sliding turning key according to a first variation of the preferred embodiment of the present invention.

Hub 1501 has an opening 1502 that runs the length (vertically, as depicted) of hub 1501 such that a matching shaped part 1601 (e.g., a sliding key or keyed part) can pass through that opening 1502 in that hub 1501. FIG. 16 depicts such a matching shaped part. Matching shaped part 1601 fits the shape of opening 1502 such that this matching shaped part 1601 can smoothly slide up and down within opening 1502 when matching shaped part moves up and down. But, when matching shaped part 1601 is rotated about the vertical axis, the assembly comprising top plate 1503, bottom plate 1507, and hub 1501 will likewise rotate about the vertical axis, as will be clear to those skilled in the art. The cross sectional shape of the keyed part can be almost any shape other than circular, but a flat key as depicted or one shaped like a plus-sign (+) in cross section would work well, as will be clear to those skilled in the art.

Figure 17:
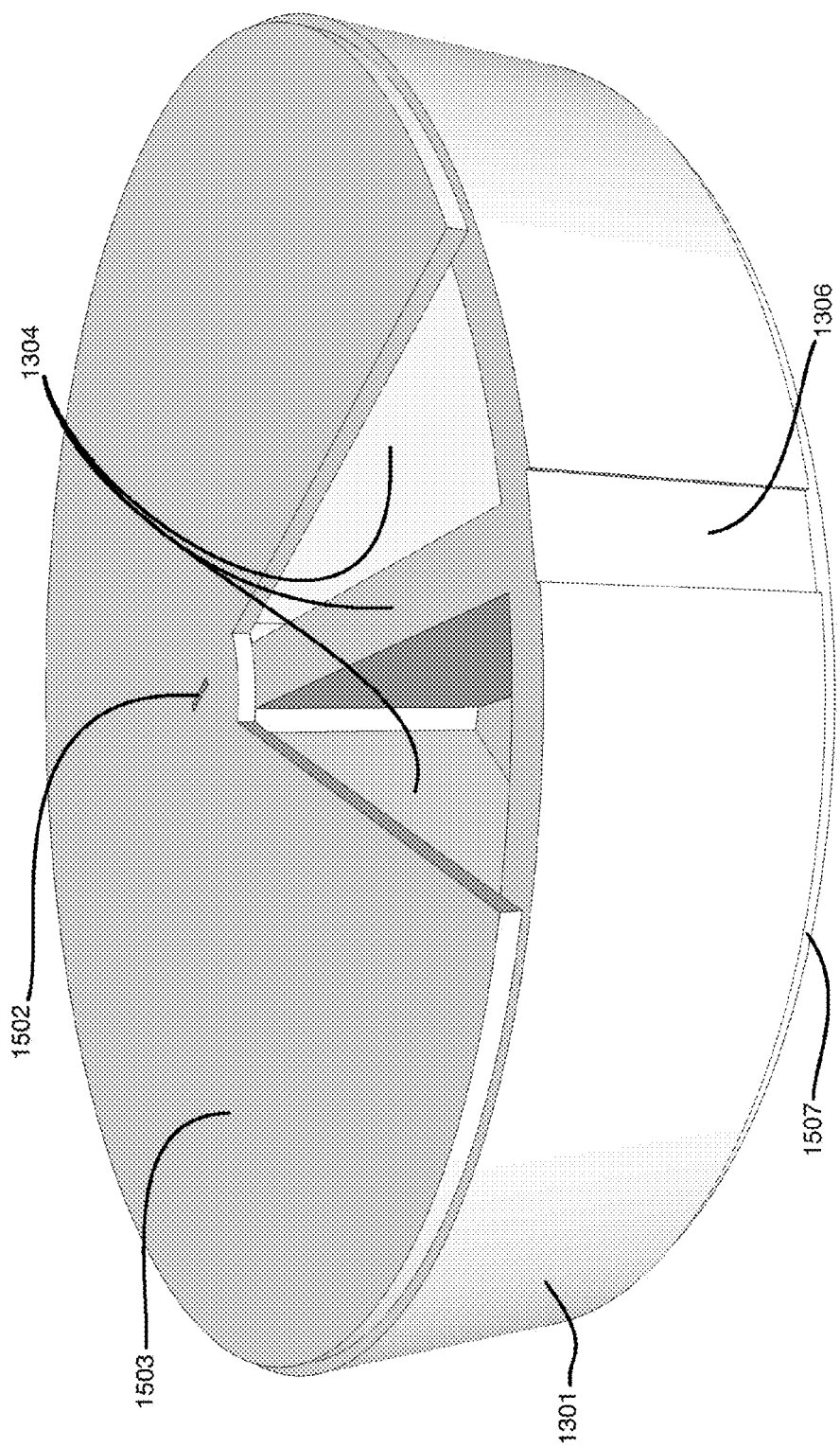
FIG. 17 depicts the assembled chambers ring and blade assembly according to a first variation of the preferred embodiment of the present invention.
Figure 18:
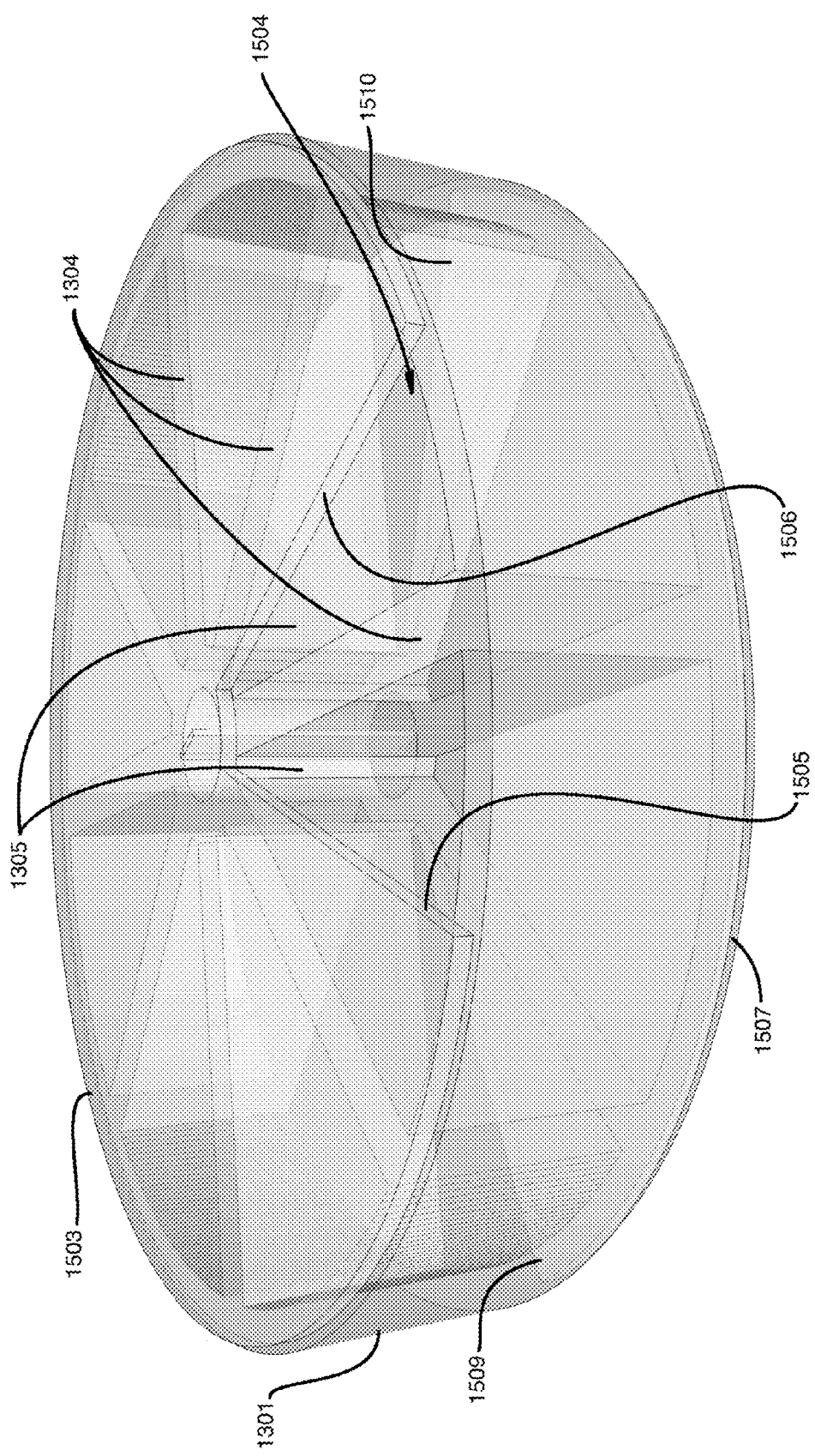
FIG. 18 depicts an xray view of the assembled chambers ring and blade assembly according to a first variation of the preferred embodiment of the present invention.

FIG. 17 (FIG. 18 shows the same view in x-ray) depicts the assembled combination of chambers ring 1301 and the assembly comprising top plate 1503, bottom plate 1507, and hub 1501. As is shown, when the opening in top plate 1503 exposes one or two of the inner chambers, bottom plate 1507 will cover the bottom of those same chambers. In this way, powdered or granulated material such as a spice (or medicine, or any of a multitude of other materials that can flow) will be unable to flow through the chamber and, instead will either flow into or out of the exposed chamber (depending on the orientation of the chamber on a container such as a spice bottle).

Figure 12:
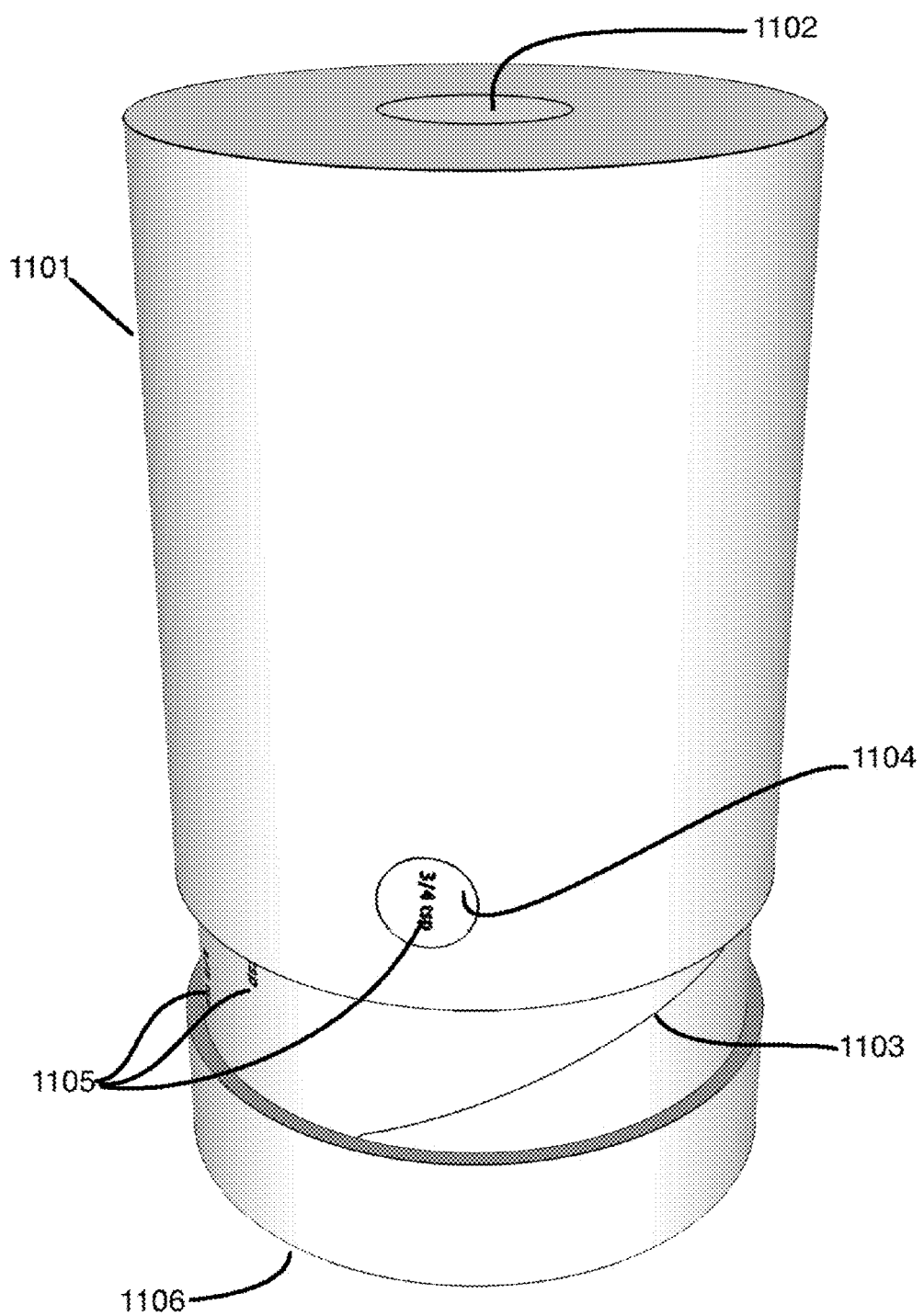
FIG. 12 depicts the assembled spice-top according to a preferred embodiment of the present invention.

During use, the assembly of the chambers ring and the blade unit would be positioned at the opening of a container (such as at the opening of neck 102 of a spice jar 101). When the jar is standing upright, the spice will be in the jar and any spice that was remaining in the chambers of chamber ring 1301 will fall back into the jar as the cover and blade unit are rotated. When the jar is closed, the outer shell 1101 (as depicted in FIG. 12) will be screwed to its fully lowered position on thread 1103. The top would then be turned in an opening motion (as any jar top would be twisted for opening as is well understood by those skilled in the art) until the desired measurement amount indication 1105 is visible through the window 1104. Click stops will help to provide tactile and/or audible feedback to the user and to provide stopping points when the top is rotated to each measurement point. In FIG. 12, the measure for ¾ teaspoon is showing through the window. At this point, the blade unit will block three of the chambers (these chambers will be adjacent chambers) from the inside of the jar and will open one chamber (which will be the center chamber of the three adjacent chambers blocked from the interior of the jar) to the top opening 1102. As the top 1101 (shown in FIGS. 11 and 12) is twisted and raised, the chamber covering blade unit will likewise rotate, but will otherwise remain in its position within the chamber ring (it will not rise along with the top because matching shaped part 1601, which is fixed in the interior center of top 1101, will smoothly slide up and down within opening 1502 when matching shaped part 1601 rises as the top rises). As such, the spiral track 1003 on the exterior of body 1001 that mates with the spiral groove on the inner surface of cover portion 1101 to facilitate the raising and lowering of cover portion 1101 as it is rotated need (as shown in FIG. 11) only be steep enough to allow indicator window 1104 to operate as the top portion is rotated and raised or lowered (i.e., such that the raising and lowering of cover portion 1101 will rise or lower just enough to only display the intended measure text through the opening 1104 and not the measure text of a vertically adjacent measure text).

Once the measured amount is selected by clicking the measurement 1105 into the viewing window 1104, the jar is inverted and spice will fill the five chambers not blocked by blade 1507. While the jar is still inverted, the top 1101 is clicked back towards the closed position. As this is done, the blade 1507 will move to cover the chamber adjacent to the three covered chambers and will uncover the chamber to the opposite end of the opening in blade 1507. Following one eighth of a turn, three chambers will once again be covered (two of which were covered when the jar was first inverted), however no spice will yet be dispensed. As the top is twisted yet another eighth of a turn, and the first of the chambers that had become filled with spice when the jar was inverted will be revealed by the opening in plate 1503 and the spice from that one chamber will be dispensed. With each additional eighth of a turn, one more chamber full of spice will be dispensed until the top 1101 is returned to its closed position.

Figure 19:
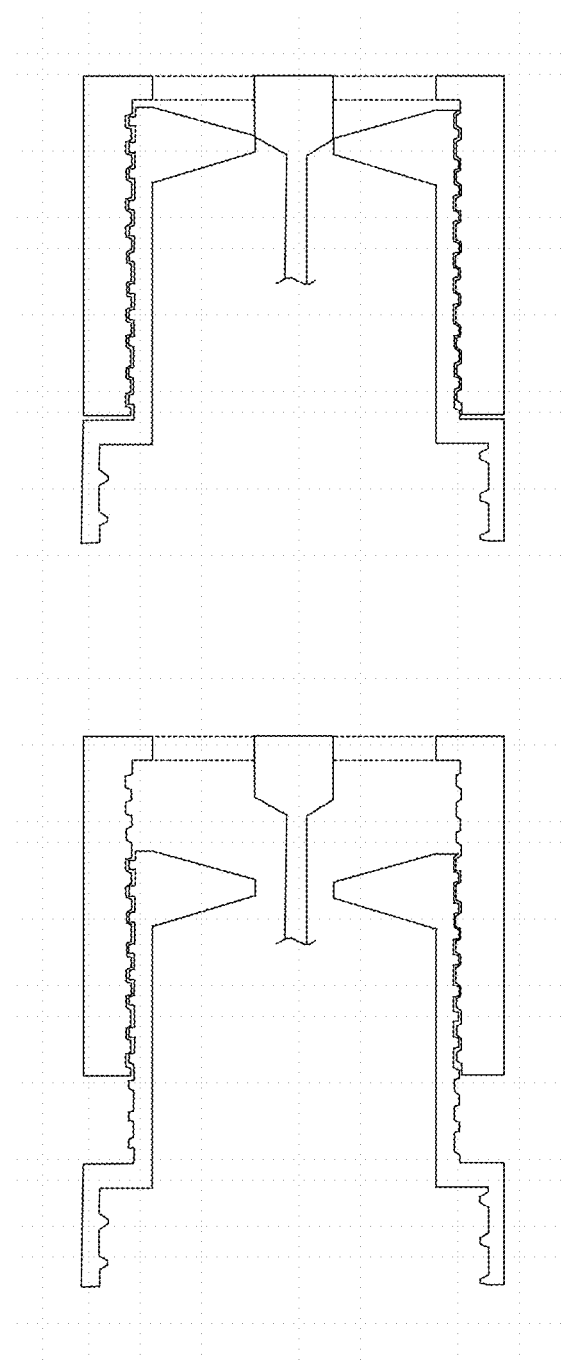
FIG. 19 depicts a cross section showing the sealing mechanism between the body component and the rotating cover component.

Since the cover portion 1101 rises and lowers as it is turned on threads 1103 that mesh with body 1001, the opening 1102 can be made to a plug an opening that does rise or lower such that when the cover portion 1101 reached its lowest position, the plug meets with opening 1102 and seals the container. In this way, when the cover portion 1101 is first turned to set the intended measurement amount, cover portion 1101 rises and separates from the plug to unseal the container and as when the cover portion 1101 is later turned back to dispense the intended measurement amount (after the container is inverted), cover portion 1101 lowers to meet the plug and seal the container. FIG. 19 shows a general purpose version of this seal and unseal mechanism in cross section that can be utilized with the variations of the present invention as described herein.

In FIG. 19, cover portion 1901 rises and lowers as it is turned on the screw-thread-like track meshing with the body 1905 and as it does so, raises and lowers the center hub 1903. This center hub 1903 is surrounded by openings 1902 while fins attach this center hub to the outer walls of cover portion 1901. The narrower portion 1904 extending out of the bottom of hub 1903 either acts as the shaft 805 to which is attached the spiral blade (in the first embodiment) or acts as the matching shaped part 1601 that is keyed to fit into and slide through the chamber ring or chamber cover assembly. When the cover portion is in its fully down position (as shown in the top drawing of FIG. 19), the hub 1903 becomes snug within the narrowing 1906 of the body 1905. However, as the cover portion is rotated, it is raised away from its fully down position (as shown in the lower drawing of FIG. 19), the hub 1903 pulls back from the narrowing 1906 of the body 1905 allowing material to be dispensed to flow through the opening in the center of narrowing 1906, around hub 1903 and out to the exterior of the container and closure through openings 1902.

Many variations of this form of the invention will come to mind to those skilled in the art. FIG. 15 depicts a blade unit comprising three components: a top plate 1503, a bottom plate 1507, and a hub 1501. This blade unit could be assembled from two or more pieces (such as a molded hub with stainless steel plates 1503 and 1507) or it could be formed (for example by injection molding) as a single plastic piece. The finished blade unit could be surrounded by the chambers ring 1301 in which case the chambers ring 1301 would have to be formed as two or more pieces that would be assembled about the center hub 1501 of the blade unit. Alternatively, the chambers ring could have a single opening such that this one piece could be snapped into place about the hub 1501 of the blade unit. The chamber ring could comprise more or fewer chambers than the eight depicted in the figures and described above. The chambers ring could be molded into the interior of the screw ring body rather than be inserted into the opening of the jar neck as a separate piece. Screw ring 1106 could have clips instead of threads such that the device would be snapped onto the top of a jar rather than be screwed onto a jar. A separate lid (such as the lid 103 shown in FIG. 1) can be included with the device that can screw-on or snap-on or press-on (i.e., held on by friction) to the top end of the cover portion to further seal the container; this lid could be left in place during dispensing in order to capture the measured amount of material within the top area of the closure until it is needed.

Alternatively, the top plate 1503 and bottom plate 1507 could be fixed relative to the interior of neck 102 of jar 101 and the chambers ring 1301 could comprise the fixed opening 1502 and be able to rotate freely within the interior of neck 102. In this variation, as the top 1101 is twisted and raised, the chamber ring will rotate (instead of the top and bottom plates), but will otherwise remain in its position between top plate 1503 and bottom plate 1507 which are both fixed to the interior of neck 102 (the chamber ring will not rise along with the top because matching shaped part 1601, which is fixed in the interior center of top 1101, will smoothly slide up and down within opening 1502 which is now a part of and in the center of the chambers ring 1301). The important thing is that the chambers rotate relative to the top and bottom blades to enable spice to flow in and out of the selected chambers, regardless of whether it is the chambers ring or the blades assembly that turns along with the top.

Many other variations on the present invention may come to mind and the present disclosure is not intended to limit the invention to the precise forms disclosed herein. For example, the chambers need not all be identically sized. For example, there exists in the prior art, spice tops that include spice grinders. Grinders for grinding spices such as pepper or cinnamon have lacked adequate means to measure how much of the spice has been ground and how much remains to be ground. The present invention could incorporate such a grinder between the container and the top of the present invention. In this way, the measure first would be set, the container then would be turned upside-down and the spice would be ground until the measured volume in the spice top is filled thereby causing the ground spice to back up into the grinder and prevent any more spice from being ground. The ground and measured spice will then be captured between the grinder and the spice top such that the now ground spice can be dispensed according to the teaching above when needed. Note that in an effort to keep manufacturing costs low during mass production, several of the components described herein could be molded as an integral part of body 1001 or of cover portion 1101.

The foregoing description of an example of the preferred embodiment of the invention and the variations thereon have been presented for the purposes of illustration and description. It is not intended to be exhaustive or to limit the invention to the precise forms disclosed. Many modifications and variations are possible in light of the above teaching. It is intended that the scope of the invention be limited not by this detailed description.

I claim:

1. A closure for dispensing a measured amount of a container's contents comprising:
   (i) a first part that attaches to a container,
   (ii) a second part that is movable relative to the first part;
   (ii) a plurality of chambers,
   (iii) a chamber covering device, and
   (iv) an intended measurement selector,
   whereby
   (a) the closure is attached to the container proximate to the boundary between the interior of the container and the exterior of the container,
   (b) the motion of the second part relative to the first part comprises turning and rising,
   (c) the intended measurement selector shows an amount of material to be dispensed from the container, and
   (d) either the plurality of chambers or the chamber covering device moves along with the second part,
   (e) the chamber covering device comprises a first portion that blocks a path between the interior of the container and a first chamber of the plurality of chambers,
   (f) the chamber covering device comprises a second portion that blocks a path between the exterior of the container and a second chamber of the plurality of chambers,
   (g) each chamber of the plurality of chambers has a blocked path to the interior of the container by the chamber covering device, has a blocked path to the exterior of the container by the chamber covering device, or both has a blocked path to the interior of the container by the chamber covering device and has a blocked path to the exterior of the container by the chamber covering device.

2. The closure of claim 1 whereby being attached to a container comprises either screwing or snapping-on.

3. The closure of claim 1 further comprising means to select one out of a plurality of possible measurable amounts whereby each chamber of the plurality of chambers has a volume and each of the plurality of possible measurable amounts is a combination of volumes of one or more chambers of the plurality of chambers.

4. The closure of claim 3 whereby selection of one of the plurality of possible measurable amounts comprises moving the chamber covering device relative to the plurality of chambers such that (i) a first number of chambers is filled from the interior of the container, (ii) a second number of chambers is emptied to the exterior of the container, (iii) the first number of chambers is greater than or equal to the second number of chambers, and (iv) the volume of the second number of chambers is equal to the selected one out of a plurality of possible measurable amounts.

5. The closure of claim 3 whereby adjusting or selecting said combination of volumes comprises engaging one or more stop-points whereby a given stop-point corresponds to a given combination of volumes from a plurality of possible combinations of volumes.

6. The closure of claim 3 whereby the combination of volumes of one or more chambers of the plurality of chambers comprises including the contribution of the volume of one or more chambers more than once.

7. The closure of claim 3 whereby the selected measurable amount can be held in one or more chambers by the chamber covering device prior to being passed to the exterior of the container.

8. The closure of claim 3 whereby the selected measurable amount can be returned to the interior of the container by moving the chamber covering device to unblock the path between one or more chambers and the interior of the container.

9. The closure of claim 3 whereby the selection means comprises a visual indication of the size of said measurable amount.

10. The closure of claim 9 whereby the selection means comprises a visual indicator that indicates one of the plurality of possible measurable amounts.

11. The closure of claim 1 further comprising means to seal the container to which it is attached.

12. The closure of claim 11 whereby the means to seal the container comprises a removable cap.

13. The closure of claim 1 comprising means to separate a specific amount of the material contained within the container from the rest of the material still within the container.

14. The closure of claim 1 further comprising means to grind or otherwise reduce the particle size of the contents of the container.

15. The chamber covering device of claim 1 whereby the first and second portions of the chamber covering device are comprised by a single spiraling surface.

16. The first and second parts of claim 1 further comprising matching threaded surfaces whereby as the second part is rotated about an axis relative to the first part, the second part will travel along the length of said axis and open a path to the exterior of the container.

17. A method of dispensing a flowable material from within a container having a closure comprising the steps of: turning a top portion of the container's closure in a first direction until a desired measured amount of flowable material is shown on an indicator, inverting the container, and turning said top portion of the container's closure in a second direction different than the first direction to dispense the desired measure of the flowable material.

18. The method of claim 17 whereby the direction of the second direction is opposite the direction of the first direction.

19. The method of claim 17 whereby turning the top portion of the container's closure in the first direction unseals said container and turning the top portion of the container's closure in the second direction reseals said container.

* * * * *